3,458,378
METHOD OF PRODUCING LAMINATED PLASTIC TUBING
Otto Ambros, Kniebisstr. 14, Mannheim, Germany; Gerhard Hauck, Ranzel uber, Troisdorf, Germany; and Manfred Frings, Rahserstrasse 11, Viersen, Germany
No Drawing. Filed Dec. 27, 1965, Ser. No. 516,768
Claims priority, application Germany, Dec. 31, 1964, F 44,866
Int. Cl. B29d 23/04; B32b 1/08
U.S. Cl. 156—244
8 Claims

ABSTRACT OF THE DISCLOSURE

This invention relates to a method of producing laminated plastic tubing in which two tubular formations are coaxially extruded in which a gas consisting partially of molecular oxygen having a fluid ester of titantic acid dispersed therein is introduced into the annular space between the two freshly extruded tubes in order to produce a superior bond between the tubes.

---

This invetnion relates to a method of producing laminated plastic tubing, and particularly to an improvement in the known method in which two layers of thermoplastic material are simultaneously extruded in fluid condition from two concentric annular nozzles, and are bonded to each other immediately after extrusion while still somewhat fluid.

Only a limited number of plastics or synthetic thermoplastic polymers can be bonded to each other in the known method at the temperatures and pressures normally available to form a product which has adequate delamination resistance. It has therefore been proposed heretofore to improve the bond strength of the two plastic layers by activating the superposed surfaces thereof. Ozone has been disclosed in U.S. Patent No. 3,184,358 to produce good bonds between many treated plastic materials, but ozone is not stable, and must be produced for immediate consumption in apparatus which cannot be handled conveniently. The bonds obtained by ozone activation of plastic surfaces, moreover, do not resist boiling water. A compound plastic film bonded after ozone activation is promptly delaminated by contact with boiling water.

We now have found that bonds resistant to boiling water can be established between plastics by simultaneously exposing the surfaces to be bonded to molecular oxygen ($O_2$) and to esters of titanic acid. In producing plastic tubing, we continuously extrude two tubular bodies of fluid thermoplastic polymer in a common direction in such a manner that respective moving faces of the two bodies define therebetween a chamber which is of annular cross section transversely of the common direction of extrusion. A gas, which at least partly consists of molecular oxygen and in which a fluid ester of titanic acid is dispersed, is fed to the chamber where the ester and the oxygen react with the faces of the two bodies which may thereafter be superposed under suitable pressure to form a strong bond. The decomposition products of the ester together with the excess of the gas are withdrawn from the chamber.

The mixture of titanic acid ester and oxygen-bearing gas is prepared most conveniently by passing a stream of the gas through a body of liquid ester, preferably at elevated temperature. The gas may be pure oxygen or a mixture of oxygen with inert diluents, such as air. The mixture of gas and ester may be fed through one or more openings in the extrusion head into the chamber between the two moving extruded layers of synthetic polymer, and the decomposition products may be withdrawn from the chamber through other openings in the extrusion head, the chamber being otherwise sealed in the direction of extrusion by the face of the extrusion head from which the two tubular bodies are extruded, and by the bond formed between the two layers.

Thermoplastic, extrudable, synthetic polymers which have been bonded successfully by the method of the invention to each other and to themselves include such homopolymers as polyethylene, polypropylene, various polyamides, polyvinyl chloride, polyurethane, polyesters, polyvinylidene chloride, and copolymers having two or more monomers in common with the above homopolymers.

The extrusion temperature is selected to suit the extruded material in a manner well known in itself. It is necessary that the two tubular bodies still be somewhat fluid when they are superposed for bonding, yet a certain viscosity must be maintained after extrusion as is well understood in this art. The improved bonding process of the invention neither requires changes in the accepted extrusion temperatures nor is it affected by the specific temperatures chosen.

The esters of titanic acid which are preferred for carrying out this invention are those of the lower alkanols. Titanium isopropylate, $Ti(OC_3H_7)_4$, and the corresponding titanium ethylate have been found to combine ready availability and excellent bonding effect, but similar results have been obtained with the corresponding titanates of tert-butanol, and of tert-amyl alcohol. The halides of titanium, particularly titanium tetrachloride, the halides of tin, silicon, and antimony, the alcoholates of tin, silicon, antimony, and boron, and the vanadium oxalcoholates have somewhat related effects.

The titanates are more readily dispersed in the liquid state in oxygen or an oxygen bearing gas is preheated to a temperature below their boiling point or decomposition temperature. Temperatures of 100 to 180° C. are generally applicable to the esters of the lower alkanols, and a temperature of 120 to 150° C. has been found best.

The amount of titanic acid ester required for producing a strong bond appears to be extremely small, and an excess has not been found to have harmful results. No effect therefore need be made for controlling the exact quantity of ester that is being carried along by a stream of oxygen or oxygen-bearing gas.

The rate at which the latter is passed through the chamber confined between the two faces of thermoplastic material to be bonded to each other has a greater bearing on the strength of the bond, and it is advisable to determine the optimum rate of oxygen supply for each set of materials and specific operating conditions. When titanium isopropylate is dispersed in pure oxygen for contact with thermoplastic surfaces, about 80 to 100 liters of oxygen are required per hour. With titanium ethylate, the rate of oxygen supply is approximately 200 to 250 liters per hour. These figures are based on an extrusion rate of 3 to 4 meters per minute.

The following examples are further illustrative of the present invention, and it will be understood that the invention is not limited thereto.

Example 1

A single extrusion head of the type shown in the aforementioned patent and having two concentric annular nozzles 110 mm. and 140 mm. in diameter respectively connected to two screw extruders was kept at a temperature of 245° C. Polyethylene and a commercial polyamide were simultaneousily extruded from the two nozzles respectively at a rate of approximately 3 meters per minute.

A stream of dry oxygen was passed at a rate of 90 liters per hour through titanium isopropylate held at a temperature of 120° C. in an otherwise sealed container. The dispersion of fine titanate droplets in oxygen obtained thereby was fed through openings in the extrusion head to the annular chamber in part bounded by the two moving tubular bodies of fluid thermoplastic material coaxially discharged from the nozzles. The mainly gaseous mixture was withdrawn from the afore-mentioned annular chamber through other openings in the extruder head at such a rate that the pressure in the chamber remained substantially equal to ambient atmospheric pressure. The two tubular plastic bodies were contiguously superposed under pressure at some distance from the extrusion head by air centrally injected into the inner tube which was thereby expanded. The laminate obtained was stretched biaxially at a ratio of 1:2, and coiled.

The bond strength between the polyethylene and polyamide layers varied in several runs between 200 and 350 grams per centimeter. The bond strength produced by merely superimposing the two hot plastic layers without blowing titanium isopropylate into the chamber between the two faces to be bonded, but under otherwise identical conditions, was 10 grams per centimeter.

Example 2

The procedure of Example 1 was repeated with titanium ethylate replacing the isopropylate, and with the rate of oxygen supply increased to 180 to 190 liters per hour. The bond between the polyethylene and the polyamide had a strength of 300 to 400 grams per centimeter.

The tubular laminates obtained by the procedures of Examples 1 and 2 were made into bags which could be immersed in boiling water for 40 minutes without causing separation of the two layers.

It should be understood, of course, that the foregoing disclosure relates only to preferred embodiments of the invention, and that it is intended to cover all changes and modifications of the invention herein chosen for the purpose of the disclosure which do not constitute departures from the spirit and scope of the invention.

What is claimed is:
1. A method of producing laminated plastic tubing which comprises:
(a) continuously extruding a first tubular body of a fluid thermoplastic synthetic polymer in a predetermined direction, said tubular body having an axis extending in said direction, and defining therein a space about said axis;
(b) axially continuously extruding a second tubular body of a fluid thermoplastic synthetic polymer into said space in such a manner that respective faces of said two bodies bound therebetween a chamber of annular cross section transverse of said axis;
(c) feeding a gas at least partly consisting of molecular oxygen having a fluid ester of titanic acid dispersed therein to said chamber, whereby said ester and said oxygen react with the fluid polymers of said faces;
(d) withdrawing the remainder of said gas and of said ester from said chamber;
(e) continuously superposing said faces outside said chamber at a pressure sufficient for bonding the faces to each other.

2. A method as set forth in claim 1, wherein said ester of titanic ester is a lower-alkyl ester.

3. A method as set forth in claim 2, wherein said ester of titanic acid is ethyl titanate.

4. A method as set forth in claim 2, wherein said ester of titanic acid is isopropyl titanate.

5. A method as set forth in claim 2, wherein said gas essentially consists of molecular oxygen.

6. A method as set forth in claim 5, wherein said gas is substantially free from water vapor.

7. A method as set forth in claim 6, wherein the polymer of each of said tubular bodies is a member of the group consisting of the homopolymers, polyethylene, polypropylene, polyamide, polyvinyl chloride, polyvinylidene chloride, polyurethane, polyester, and of copolymers having two or more monomers in common with said homopolymesr.

8. A method as set forth in claim 1, wherein said ester of titanic acid is dispersed in said gas in the liquid state prior to the feeding of said gas to said chamber.

References Cited

UNITED STATES PATENTS

| 2,984,641 | 5/1961 | Wolinski | 117—161 X |
| 3,002,854 | 10/1961 | Brill | 260—429.5 |
| 3,057,753 | 10/1962 | Blatz | 260—429.5 |
| 3,184,358 | 5/1965 | Utz | 156—244 |
| 3,227,605 | 1/1966 | Wolinski | 264—83 |

EARL M. BERGERT, Primary Examiner

T. R. SAVOIE, Assistant Examiner

U.S. Cl. X.R.

117—47; 260—429.5; 264—83